(12) United States Patent
McDaniel et al.

(10) Patent No.: US 7,700,516 B2
(45) Date of Patent: Apr. 20, 2010

(54) METHODS OF PREPARING A POLYMERIZATION CATALYST

(75) Inventors: Max P. McDaniel, Bartlesville, OK (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 11/862,014

(22) Filed: Sep. 26, 2007

(65) Prior Publication Data

US 2009/0082197 A1 Mar. 26, 2009

(51) Int. Cl.
 B01J 21/06 (2006.01)
 B01J 23/26 (2006.01)
(52) U.S. Cl. .................. 502/309; 502/242; 502/256
(58) Field of Classification Search ............. 502/242, 502/256, 309
See application file for complete search history.

(56) References Cited

U.S. PATENT DOCUMENTS

| | | | |
|---|---|---|---|
| 3,248,179 | A | 4/1966 | Norwood |
| 3,622,521 | A | 11/1971 | Hogan et al. |
| 3,887,494 | A | 6/1975 | Dietz |
| 4,280,141 | A | 7/1981 | McCann et al. |
| 4,446,243 | A | 5/1984 | Chester et al. |
| 4,501,885 | A | 2/1985 | Sherk et al. |
| 4,588,790 | A | 5/1986 | Jenkins, III et al. |
| 5,352,749 | A | 10/1994 | DeChellis et al. |
| 5,436,304 | A | 7/1995 | Griffin et al. |
| 5,455,314 | A | 10/1995 | Burns et al. |
| 5,565,175 | A | 10/1996 | Hottovy et al. |
| 5,575,979 | A | 11/1996 | Hanson |
| 6,239,235 | B1 | 5/2001 | Hottovy et al. |
| 6,262,191 | B1 | 7/2001 | Hottovy et al. |
| 6,707,498 | B1 | 3/2004 | Toma et al. |
| 6,833,415 | B2 | 12/2004 | Kendrick et al. |
| 2003/0007083 | A1 | 1/2003 | Rossi et al. |
| 2004/0026324 | A1* | 2/2004 | Luca .................. 210/660 |
| 2007/0034549 | A1 | 2/2007 | Elomari |

FOREIGN PATENT DOCUMENTS

| | | |
|---|---|---|
| EP | 088989 A2 | 9/1983 |
| EP | 0314385 A2 | 5/1989 |
| EP | 085857 B1 | 8/1989 |
| EP | 0337365 A2 | 10/1989 |
| EP | 0339571 A1 | 11/1989 |
| EP | 0455444 A1 | 11/1991 |
| EP | 0589643 A1 | 3/1994 |
| WO | 9311173 A1 | 6/1993 |
| WO | 2009042149 A2 | 4/2009 |
| WO | 2009042149 A3 | 4/2009 |

OTHER PUBLICATIONS

Bouh, Abdillahi Omar, et al., "Mono- and Dinuclear Silica-Supported Titanium(IV) Complexes and the Effect of TiOTi Connectivity on Reactivity," J. Am. Chem. Soc., 1999, pp. 7201-7210, vol. 121, No. 31, American Chemical Society.

Conway, Steven J., et al., "Chromia/Silica—Titania Cogel Catalysts for Ethene Polymerisation: Infrared Study of Nitric Oxide Adsorption," J. Chem. Soc., 1989, pp. 79-90, vol. 85, No. 1, Faraday Trans. 1.

Conway, Steven J., et al., "Chromia/Silica—Titania Cogel Catalysts for Ethene Polymerisation: Polymer Characteristics," J. Chem. Soc., 1989, pp. 1841-1851, vol. 85, No. 7, Faraday Trans 1.

Conway, Steven J., et al., "Chromia/Silica—Titania Cogel Catalysts for Ethene Polymerisation: Polymerisation Kinetics," J. Chem. Soc., 1989, pp. 71-78, vol. 85, No. 1, Faraday Trans. 1.

Ellison, Alan, et al., "Chacterisation of modified Cr—silica catalysts," Journal of Molecular Catalysis, 1994, pp. 81-86, vol. 90, Elsevier Science B. V.

Ellison, Alan, et al., "Characterisation of Cr/Silica Catalysts Part 2—Ti- and Mg-modified Catalysts," J. Chem. Soc., 1993, pp. 4393-4395, vol. 89, No. 24, Faraday Trans.

Mabilon, G., et al., "Copolymérisation éthylè-propyléne par des catalyseurs à l'oxyde de chrome," Eur. Polym. J., 1985, pp. 245-249, vol. 21, No. 3, Pergamon Press Ltd.

McDaniel, M. P., et al., "The Activation of the Phillips Polymerization Catalyst," Journal of Catalysis, 1983, pp. 118-126, vol. 82, Academic Press, Inc.

Pullukat, T. J., et al., "A Chemical Study of Thermally Activated Chromic Titanate on Silica Ethylene Polymerization Catalysts," Journal of Polymer Science: Polymer Chemistry Edition, 1980, pp. 2857-2866, vol. 18, John Wiley & Sons, Inc.

(Continued)

Primary Examiner—Timothy C Vanoy
Assistant Examiner—Daniel Berns
(74) Attorney, Agent, or Firm—Conley Rose, P.C.; Rodney B. Carroll; Cheryl L. Huseman

(57) ABSTRACT

A method of preparing a catalyst comprising contacting a support with a trivalent titanium compound and a chromium-containing compound. A catalyst composition comprising a support, chromium, and titanium, wherein the titanium is derived from $TiCl_3$, $Ti_2(SO_4)_3$, $Ti(OAc)_3$, $Ti(+3)$ oxylate, $Ti(NO_3)_3$, $Ti(+3)$ lactate or combinations thereof.

20 Claims, No Drawings

OTHER PUBLICATIONS

Pullukat, Thomas J., et al., "Titanium modified chromium catalysts for ethylene polymerization," Symposium on Transition Metal Catalyst Polymerization, Michigan Molecular Institute, Aug. 1981, pp. 697-712.

Rebenstorf, B., et al., "Influence of chromium concentration and addition of flourine, titanium, or boron on the chromium species of the phillips catalyst: a quantitative evaluation," Langmuir, 1991, pp. 2160-2165, vol. 7, No. 10, American Chemical Society.

Foreign communication from a related counterpart application—International Search Report and Written Opinion, PCT/US2008/011068, Mar. 23, 2009, 18 pages.

* cited by examiner

METHODS OF PREPARING A POLYMERIZATION CATALYST

FIELD OF THE INVENTION

The present disclosure relates to catalyst compositions. More specifically, the present disclosure relates to methods of preparing polymerization catalyst compositions.

BACKGROUND OF THE INVENTION

Olefin polymerization catalysts are known in the art, however methods of producing these catalysts may suffer from a variety of drawbacks. Enhancements in preparation methods for olefin polymerization catalysts can reduce the costs associated with catalyst production and improve process economics. Thus, there is an ongoing need to develop new methods of preparing olefin polymerization catalysts.

SUMMARY OF THE INVENTION

Disclosed herein is a method of preparing a catalyst comprising contacting a support with a trivalent titanium compound and a chromium-containing compound.

Also disclosed herein is a catalyst composition comprising a support, chromium, and titanium, wherein the titanium is derived from $TiCl_3$, $Ti_2(SO_4)_3$, $Ti(OAc)_3$, $Ti(+3)$ oxylate, $Ti(NO_3)_3$, $Ti(+3)$ lactate or combinations thereof.

DETAILED DESCRIPTION

Disclosed herein are methods of producing catalysts. In an embodiment, the catalysts comprise a support, titanium, and chromium and may function to catalyze the polymerization of olefins. In the past, it has been very difficult to titanate a Cr/silica catalyst from an aqueous solution, due to the limitations of $Ti^{4+}$ chemistry. The present disclosure provides a way of applying titanium to a catalyst from an aqueous environment. The catalysts may be prepared by contacting the support with a trivalent titanium ($Ti^{3+}$)-containing compound and a chromium-containing compound. The contacting of the support with the $Ti^{3+}$-containing compound and chromium-containing compound may be simultaneous; alternatively, the contacting may be carried out sequentially (e.g., $Ti^{3+}$ followed by Cr or vice-versa); alternatively, the contacting may be carried out in combinations of simultaneous and/or sequential addition; and such methods are described in more detail later herein.

In an embodiment, the catalyst system comprises a support. The support may primarily include an inorganic oxide such as silica, alumina, aluminophosphates, or mixtures thereof. In an embodiment, the support contains greater than about 50 percent (%) silica, alternatively greater than about 80% silica, by weight of the support. The support may further include additional components that do not adversely affect the catalyst system, such as zirconia, alumina, boria, thoria, magnesia, or mixtures thereof. The support may have a surface area and pore volume effective to provide for an active catalyst. The surface area of the support may range from about 100 square meters per gram ($m^2/g$) to about 1,000 $m^2/g$, alternatively from about 200 $m^2/g$ to about 800 $m^2/g$, or from about 250 $m^2/g$ to about 700 $m^2/g$. Further, the pore volume of the support may range from about 0.5 cubic centimeters per gram (cc/g) to about 3.5 cc/g or alternatively from about 0.8 cc/g to about 3 cc/g. Hereinafter for simplicity, the disclosure will refer to silica as the support although other supports such as have been described herein may be contemplated.

In an embodiment, a method of preparing a catalyst comprises contacting the support with an aqueous solution comprising a trivalent titanium ($Ti^{3+}$)-containing compound. The $Ti^{3+}$-containing compound may be any compound that comprises trivalent titanium, alternatively the $Ti^{3+}$ containing compound may be any compound that is soluble in an aqueous solution and able to release a $Ti^{3+}$ species into solution. Examples of suitable $Ti^{3+}$-containing compounds include without limitation $TiCl_3$, $(Ti)_2(SO_4)_3$, $Ti(OH)Cl_2$, $TiBr_3$, and the like. Such compounds may be contacted with a support by techniques to be described in more detail later herein to yield a percentage titanium of from about 0.1% to about 10% by weight of the catalyst, alternatively from about 0.5% to about 8%, alternatively from about 1% to about 5%. Herein the percentage titanium refers to the final percent titanium associated with the support material by total weight of the material after all processing steps. Without wishing to be limited by theory, the contacting of a support and a compound able to release $Ti^{3+}$ into solution may result in an increased dispersion of the titanium on the support compared to a similar process carried out using a compound able to release a tetravalent titanium ($Ti^{4+}$) species. The increased dispersion of the titanium on the support may allow for the increased formation of catalytically active species between titanium and other metals such as for example chromium.

In an embodiment, a method of preparing a catalyst comprises contacting a support with a chromium-containing compound. The chromium-containing compound may comprise a water-soluble chromium compound. Alternatively, the chromium-containing compound comprises a hydrocarbon-soluble chromium compound. Examples of water-soluble chromium compounds include chromium oxide, chromium trioxide, chromium acetate, chromium nitrate, or combinations thereof. Examples of hydrocarbon-soluble chromium compounds include tertiary butyl chromate, a diarene chromium (0) compound, biscyclopentadienyl chromium (II), chromium (III) acetylacetonate, or combinations thereof. In one embodiment, the chromium-containing compound may be a chromium (II) compound, chromium (III) compound, or combinations thereof. Suitable chromium (III) compounds include, but are not limited to chromium carboxylates, chromium naphthenates, chromium halides, chromium sulfate, chromium nitrate, chromium dionates, or combinations thereof. Specific chromium (III) compounds include, but are not limited to, chromium (III) sulfate, chromium (III) chloride, chromium (III) nitrate, chromic bromide, chromium (III) acetylacetonate, chromium (III) acetate. Suitable chromium (II) compounds include, but are not limited to chromous chloride, chromous bromide, chromous iodide, chromium (II) sulfate, chromium (II) acetate, or combinations thereof.

The amount of chromium present in the catalyst may range from about 0.01% to about 10% by weight of the catalyst, alternatively from about 0.2% to about 5%, or from about 0.5% to about 2%. Herein the percentage chromium refers to the final percent chromium associated with the support material by total weight of the material after all processing steps.

In an embodiment, a method of preparing a catalyst comprises contacting silica with a $Ti^{3+}$-containing compound, for example a solution comprising a $Ti^{3+}$-containing compound. The silica may be contacted with the $Ti^{3+}$-containing compound by employing a variety of known contacting techniques, e.g., ion-exchange, incipient wetness, pore fill, impregnation, etc. In an embodiment, the silica is contacted with the $Ti^{3+}$-containing compound by impregnation with a $Ti^{3+}$-aqueous salt solution to form a titanated silica. The titanated silica may then be dried to remove solvent and form a dried titanated silica. The drying may be carried out in a temperature range of from about 25° C. to about 300° C., alternatively from about 50° C. to about 200° C., alternatively from about 80° C. to about 150° C. and for a time of from about 0.1 min to about 10 hours, alternatively from about 0.2 min to about 5 hours, alternatively from about 30 min to about 1 hour. The drying may be carried out in an inert atmosphere (e.g. under vacuum, He, Ar or nitrogen gas) so as to prevent premature oxidation of the $Ti^{3+}$. The method may further comprise calcining the dried titanated silica in the presence of air to oxidize the $Ti^{3+}$ to $Ti^{4+}$ and attach the titanium to the silica and form a dried calcined titanated silica. For example, the dried titanated silica may be calcined in the presence of air at a temperature in the range of from about 400° C. to about 1,000° C., alternatively from about 500° C. to about 900° C., and for a time of from about 1 hour to about 30 hours, alternatively from about 2 hours to about 20 hours, alternatively from about 5 hours to about 12 hours. The method may further comprise adding a chromium-containing compound to the dried calcined titanated silica to form a Ti/Cr-silica. The chromium-containing compound may be a water-soluble compound or a hydrocarbon-soluble compound such as those previously described herein and may be introduced to the dried calcined titanated silica using the contacting techniques also previously described herein. The Ti/Cr-silica may be dried again to remove solvent introduced by the addition of the chromium-containing compound at temperatures ranging from 25° C. to about 300° C., alternatively from about 50° C. to about 200° C., alternatively from about 80° C. to about 150° C. In one embodiment, the dried Ti/Cr-silica may then be activated via a second calcination step by heating it in an oxidizing environment to produce a chromium, titanated silica catalyst (CTSC). For example, the dried Ti/Cr-silica may be calcined in the presence of air at a temperature in the range of from about 400° C. to about 1,000° C., alternatively from about 500° C. to about 850° C. and for a time of from about 1 min to about 10 hours, alternatively from about 20 min to about 5 hours, alternatively from about 1 to about 3 hours to produce the CTSC.

In another embodiment, a method of preparing a catalyst comprises contacting silica with a chromium-containing compound to form Cr-silica. The chromium-containing compound may be a water-soluble compound or a hydrocarbon-soluble compound such as those previously described herein and may be introduced to the silica using the contacting techniques also previously described herein. The Cr-silica may be dried to remove solvent at temperatures ranging from about 25° C. to about 300° C., alternatively from about 50° C. to about 200° C., alternatively from about 80° C. to about 150° C. and for a time of from about 0.1 min to about 10 hours, alternatively from about 0.2 min to about 5 hours, alternatively from about 30 min to about 1 hour, thereby forming a dried Cr-silica. The method may further comprise contacting the Cr-silica with a $Ti^{3+}$-containing compound to form a Cr/Ti-silica. The $Ti^{3+}$-containing compound may be contacted with the Cr-silica using any of the contacting techniques previously described herein. In an embodiment, the Cr-silica is contacted with the $Ti^{3+}$-containing compound by impregnation with a $Ti^{3+}$-aqueous salt solution to form the Cr/Ti-silica. The method further comprises drying and/or calcining the Cr/Ti-silica in the presence of air to oxidize the $Ti^{3+}$ to $Ti^{4+}$ and attach the titanium to the silica. For example, the Cr/Ti-silica may be heated in the presence of air at a temperature in the range of from about 400° C. to about 1,000° C., alternatively from about 500° C. to about 850° C. and for a time of from about 1 min to about 10 hours, alternatively from about 20 min to about 5 hours, alternatively from about 1 hour to about 3 hours to produce the CTSC.

In another embodiment, a method of preparing a catalyst comprises contacting silica with a $Ti^{3+}$-containing compound and a chromium-containing compound to form a metallated silica. The contacting of the silica with the $Ti^{3+}$-containing compound and chromium-containing compound may be simultaneous; alternatively the contacting may be carried out sequentially (e.g., $Ti^{3+}$ followed by Cr or vice-versa). The $Ti^{3+}$-containing compound and chromium-containing compound may be of the types previously described herein and may be introduced to the silica using the contacting techniques also previously described herein. The metallated silica may be dried to remove solvent at temperatures ranging from about 25° C. to about 300° C., alternatively from about 50° C. to about 200° C., alternatively from about 80° C. to about 150° C. and for a time of from about 0.1 min to about 10 hours, alternatively from about 0.2 min to about 5 hours, alternatively from about 30 min to about 1 hour, thereby forming a dried metallated silica. In one embodiment, the dried metallated silica may then be activated via a calcination step by heating it in an oxidizing environment. For example, the dried metallated silica may be heated in the presence of air at a temperature in the range of from about 400° C. to about 1,000° C., alternatively from about 500° C. to about 850° C. and for a time of from about 1 min to about 10 hours, alternatively from about 20 min to about 5 hours, alternatively from about 1 to about 3 hours to produce the CTSC.

In an embodiment, the incorporation of titanium into a catalyst by the methodologies disclosed herein may lead to an increased amount of titanium available on the support and the formation of higher activity catalysts which without wishing to be limited by theory may be due to an increased number of catalytically active polymerization sites. The increased incorporation of titanium may also allow for the production of polymers with increased melt index (MI), increased high load melt index (HLMI), polymer with a lower molecular weight, polymer with a broader molecular weight distribution, or combinations thereof. The HLMI represents the rate of flow of a molten resin through an orifice of 0.0825 inch diameter when subjected to a force of 21,600 grams at 190° C. as determined in accordance with ASTM D 1238. The use of titanium to increase the HLMI of a polymer has been described by McDaniel et. al in "The Activation of the Phillips Petroleum Catalyst" published in the *Journal of Catalysis* (1983); Volume 82; pages 118-126, which is incorporated by reference herein in its entirety.

The catalysts of the present disclosure (i.e., CTSCs) are suitable for use in any olefin polymerization method known in the art, using various types of polymerization reactors. As used herein, "polymerization reactor" includes any polymerization reactor capable of polymerizing olefin monomers to produce homopolymers or copolymers. Such homopolymers and copolymers are referred to as resins or polymers. The various types of reactors include those that may be referred to as batch, slurry, gas-phase, solution, high pressure, tubular or autoclave reactors. Gas phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. The multiple reactors may be operated in series or in parallel.

According to one aspect of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems are known in the art and may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790 and 5,436,304, each of which is incorporated by reference in its entirety herein.

According to still another aspect of the disclosure, a high pressure polymerization reactor may comprise a tubular reactor or an autoclave reactor, both of which are known in the art. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization. These reactors are known in the art.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs Free energy equation. Typically this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

In an embodiment, a slurry polymerization process is employed in which the catalyst is suspended in an inert organic medium and agitated to maintain it in suspension throughout the polymerization process. The organic medium may, e.g., be a paraffin, a cycloparaffin, or an aromatic. For the production of ethylene polymers, the slurry polymerization process may be carried out in a reaction zone at a temperature of from about 50° C. to about 110° C. and at a pressure in the range of from about 100 psia to about 700 psia or higher. At least one monomer is placed in the liquid phase of the slurry in which the catalyst is suspended, thus providing for contact be between the monomer and the catalyst. The activity and the productivity of the catalyst are relatively high. As used herein, the activity refers to the grams of polymer produced per gram of solid catalyst charged per hour, and the productivity refers to the grams of polymer produced per gram of solid catalyst charged.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, resistance to crack growth, long chain branching and rheological measurements.

The concentrations of monomer, co-monomer, hydrogen, co-catalyst, modifiers, and electron donors are important in producing these resin properties. Comonomer is used to control product density. Hydrogen is used to control product molecular weight. Co-catalysts can be used to alkylate, scavenge poisons, control molecular weight and/or modify the molecular weight distribution. Modifiers can be used to control product properties and electron donors affect stereoregularity. In addition, the concentration of poisons must be minimized since they impact the reactions and product properties.

After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

Polymers such as polyethylene homopolymers and copolymers of ethylene with other mono-olefins may be produced in the manner described above using the CTSCs prepared as described herein. Polymer resins produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, bottles, fibers, and so forth. Additional end use articles would be apparent to those skilled in the art.

EXAMPLES

The invention having been generally described, the following examples are given as particular embodiments of the invention and to demonstrate the practice and advantages thereof. It is understood that the examples are given by way of illustration and are not intended to limit the specification of the claims to follow in any manner.

Example 1

The use of trivalent titanium in the preparation of a polymerization catalyst was investigated. Control catalyst samples were prepared using a silica obtained from W. R. Grace having a surface area of 500 $m^2/g$ and a pore volume of 1.6 cc/g. To activate the catalyst, about 10 grams was placed in a 1.75 inch quartz tube fitted with a sintered quartz disk at the bottom. While the catalyst was supported on the disk, dry air was blown up through the disk at the linear rate of about 1.6 to 1.8 standard cubic feet per hour. An electric furnace around the quartz tube was then turned on and the temperature was raised at the rate of 400° C. /hour to the indicated temperature, such as 600° C. At that temperature the silica was allowed to fluidize for three hours in the dry air. Afterward the catalyst was collected and stored under dry nitrogen, where it was protected from the atmosphere until ready for testing. It was never allowed to experience any exposure to the atmosphere.

Polymerization runs were made in a 2.2 liter steel reactor equipped with a marine stirrer rotating at 400 rpm. The reactor was surrounded by a steel jacket containing boiling methanol with a connection to a steel condenser. The boiling point of the methanol was controlled by varying nitrogen pressure applied to the condenser and jacket, which permitted precise temperature control to within half a degree centigrade, with the help of electronic control instruments. Unless otherwise stated, a small amount (0.01 to 0.10 grams normally) of the solid catalyst was first charged under nitrogen to the dry reactor. Next 1.2 liter of isobutane liquid was charged and the reactor heated up to the specified temperature, usually around 90° C. Finally ethylene was added to the reactor to equal a fixed pressure, normally 550 psig, which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Ethylene polymerization was carried out using ethylene obtained from Union Carbide Corporation. This ethylene was further purified through a column of ¼ inch beads of Alcoa A201 alumina, activated at 250° C. in nitrogen. Isobutane was polymerization grade obtained from Phillips Petroleum Co., Borger, Tex. The isobutene was further purified by distillation and was then passed through a column of ¼ inch beads of Alcoa A201 alumina, activated at 250° C. in nitrogen. The 1-hexene was polymerization grade obtained from Chevron Chemicals. It was further purified by nitrogen purging and storage over 13× molecular sieve activated at 250° C.

Melt Index (MI) in grams of polymer per ten minutes was determined in accordance with ASTM D1238-E, condition 190/2, at 19° C. with a 2,160 gram weight. High load melt index (HLMI, g/10 min) was determined in accordance with ASTM D1238-F, Condition 190/21.6, at 190° C. with a 21,600 gram weight.

Two of the catalyst samples were made to contain no titanium by impregnating two 20 gram silica samples with an aqueous solution containing 0.5 g Cr/g solution as chromic acetate. 40 mL of the chromic acetate solution was added, resulting in incipient wetness. The final catalyst, which contained 1 wt % Cr, was made by drying this mixture in a vacuum oven overnight at 110° C. These catalysts were then activated at 700° C. and at 900° C. and served as references. The results of polymerization runs with this catalyst are shown in Table 1 below as runs 1 and 5.

A third catalyst sample was made by first impregnating 8% titanium as an aqueous solution of TiOSO$_4$, again to incipient wetness, followed by drying in the vacuum oven at 110° C. This silica-titania was then calcined at 500° C. in an attempt to attach the titanium. This was followed by impregnation with a solution of Cr$^{3+}$-acetylacetonate in toluene, again to incipient wetness and to equal a final catalyst containing 1 wt % Cr. The toluene-wet silica was then dried under nitrogen, preventing exposure to ambient air. Finally, the mixture was activated in dry air at 700° C. which converts the trivalent Cr into its hexavalent form, from which the active sites are derived. The titanium was applied before the chromium in an attempt to maximize its effect on the polymer melt index. This catalyst was then tested for polymerization behavior, and the results are listed below in Table 1 as runs 2, 3 and 4. The influence of titania was expected to be most noticeable in the melt index potential of the catalyst, which can be gauged by examining the measured melt index or high load melt index (HLMI). By comparing Ti$^{+4}$ runs 2-4 with the "no Ti" control in run 1, all of which were activated at 700° C., little or no improvement in melt index or HLMI was observed.

Another catalyst sample was also made from the same silica and by a similar procedure, however, in these samples the silica was impregnated with an aqueous solution of Ti$^{3+}$ sulfate, again to equal 8% Ti. This silica was then dried under nitrogen to prevent premature oxidation of the titanium. After being dried the catalyst samples were calcined, in nitrogen up to 300° C. and then in air up to 900° C. A color change from blue to white indicated that this treatment had finally oxidized the Ti$^{3+}$ to Ti$^{4+}$. Then Cr was applied as described above using Cr$^{3+}$-acetylacetonate in toluene. Final activation was carried out in dry air at 400° C. in order to convert the Cr$^{+3}$ into Cr$^{+6}$, the active site precursor. By putting the Cr on after the Ti, it was hoped that this would help the Ti to attach to the silica. A non-aqueous solvent was used to prevent hydration, and possible detachment of Si—O—Ti bonds. This catalyst was then tested for polymerization behavior and the results are shown below in Table 1 as runs 6 and 7. These two runs are to be compared to control 5, which had no Ti, because in both cases the maximum calcining temperature was 900° C. From this comparison it is very clear that the experimental catalyst (runs 6 and 7) exhibits a much higher melt index potential than the control catalyst (run 5). This is obvious by examining the measured melt index or the HLMI. This indicates that, whereas impregnating Ti$^{+4}$ had no effect, impregnating Ti$^{+3}$ in this way had a major effect on melt index or HLMI. In fact the melt index potential of the Ti$^{+3}$ catalyst was so high that the reactor temperature had to be lowered by 5° C. and 10° C. to prevent producing a polymer having too high of a melt index (wax). For chromium catalysts, in general lowering the reactor temperature lowers the melt index obtained. However, in this case we observed that even though the reactor temperature was lowered by 5° C. (run 6) the melt index or HLMI obtained is still higher than of the control (run 5). Thus, the catalysts produced with the aqueous Ti$^{3+}$ provided a polymer having a higher melt index potential than the control. Even when the reactor temperature was lowered by 10° C. (in run 7), the melt index obtained was still quite respectable and the HLMI was equal to the control run, made at a reactor temperature 10° C. higher.

The exact same procedure was then used to prepare another catalyst, but instead using the Ti$^{+4}$ salt, TiOSO$_4$. After aqueous impregnation of the Ti, and drying, the support was calcined at 900° C. Finally, 1% Cr was applied as described above using Cr$^{3+}$-acetylacetonate in toluene. Again the final calcining was carried out in dry air at 400° C. in order to oxidize the trivalent Cr to its hexavalent form. This catalyst was then tested for polymerization behavior, and the results are shown in Table 1 as run 8. This run can also be compared to the "no Ti" control run 5, and shows that this catalyst did not raise the melt index or HLMI of the polymer. In fact the melt index potential of the polymer was greatly lowered. Run 8 may also be compared directly with runs 6 and 7, where the procedure and activation were identical except that Ti$^{+4}$ was used in run 8 and Ti$^{+3}$ was used in runs 6 and 7. When impregnated from an aqueous solution catalysts prepared using Ti$^{+3}$ resulted in polymers having an increased in melt index, whereas catalysts prepared using Ti$^{+4}$ did not produce polymers with an increased melt index. Since the Ti$^{+3}$ is eventually converted to Ti$^{+4}$ during activation, we concluded that only Ti$^{+3}$ is capable of effectively interacting with the silica surface in an aqueous environment.

TABLE 1

| Sample No. | Titanium added | Activation Temp. (° C.) | Reaction Temp. (° C.) | Catalyst Charged, (g) | g PE produced | Reaction time, (minutes) | MI (g/10 min.) | HLMI (g/10 min.) | Shear response HLMI/MI |
|---|---|---|---|---|---|---|---|---|---|
| 1 | NO | 700 | 105 | 0.0905 | 214 | 48.2 | 0.14 | 13.2 | 94.7 |
| 2 | Ti$^{4+}$ | 700 | 105 | 0.0823 | 166 | 77 | 0.19 | 15.9 | 82.0 |
| 3 | Ti$^{4+}$ | 700 | 105 | 0.1427 | 120 | 32 | 0.19 | 17.5 | 93.8 |
| 4 | Ti$^{4+}$ | 700 | 105 | 0.1748 | 44 | 162 | 0.22 | 19.8 | 89.8 |
| 5 | NO | 900 | 105 | 0.1225 | 241 | 57 | 1.24 | 69.3 | 55.9 |
| 6 | Ti$^{3+}$ | 900/400 | 100 | 0.6151 | 245 | 50 | 4.47 | 202.5 | 45.3 |
| 7 | Ti$^{3+}$ | 900/400 | 95 | 0.6034 | 222 | 33 | 0.53 | 68.7 | 128.9 |
| 8 | Ti$^{4+}$ | 900/400 | 105 | 0.3085 | 171 | 66 | 0.096 | 9.8 | 102.5 |

While various embodiments have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of preparing a catalyst comprising:
   contacting a support with a chromium-containing compound and an aqueous solution comprising a trivalent titanium compound to form a catalyst precursor;
   drying the catalyst precursor in an inert atmosphere to form a dried catalyst precursor; and
   calcining the dried catalyst precursor in an oxidizing atmosphere to produce a catalyst.

2. The method of claim 1 wherein the support comprises an inorganic oxide.

3. The method of claim 1 wherein the support comprises silica.

4. The method of claim 1 wherein the surface area of the support ranges from about 100 $m^2/g$ to about 1000 $m^2/g$.

5. The method of claim 1 wherein the trivalent titanium compound comprises $TiCl_3$, $Ti_2(SO_4)_3$, $Ti(OAc)_3$, Ti(+3) oxylate, Ti $(NO_3)_3$, Ti(+3) lactate or combinations thereof.

6. The method of claim 1 wherein the titanium is present in the catalyst in an amount ranging from about 0.1% to about 10% by weight of the catalyst.

7. The method of claim 1 wherein the chromium-containing compound is a water-soluble compound.

8. The method of claim 1 wherein the chromium is present in the catalyst in an amount ranging from about 0.01% to about 10% by weight of the catalyst.

9. The method of claim 1 wherein the support is contacted with the compound comprising trivalent titanium prior to contact with the chromium-containing compound.

10. The method of claim 1 wherein the support is contacted with the compound comprising trivalent titanium subsequent to contact with the chromium-containing compound.

11. The method of claim 1 wherein the support is simultaneously contacted with the compound comprising trivalent titanium and the chromium-containing compound.

12. The method of claim 1 further comprising calcining the support after addition of the titanium, the chromium, or both.

13. The method of claim 12 wherein the calcining is carried out in a temperature range of from about 400° C. to about 1000° C.

14. A polymerization catalyst as produced by the method of claim 1.

15. The method of claim 1 further comprising contacting the catalyst with an olefin monomer under suitable polymerization conditions and producing a polymer having an increased high load melt index when compared to a polymer produced using a catalyst prepared with a tetravalent titanium species in aqueous solution.

16. The method of claim 1 further comprising contacting the catalyst with an olefin monomer under suitable polymerization conditions, and producing a polymer having a lower molecular weight when compared to a polymer produced using an a catalyst prepared with a tetravalent titanium species in aqueous solution.

17. The method of claim 1 further comprising contacting the catalyst with an olefin monomer under suitable polymerization conditions and producing a polymer having a broader molecular weight distribution when compared to a polymer produced using a catalyst prepared with a tetravalent titanium species in aqueous solution.

18. The method of claim 1 further comprising contacting the catalyst with an olefin monomer under suitable polymerization conditions and producing a polymer having an increased melt index when compared to a polymer produced using a catalyst prepared with a tetravalent titanium species in aqueous solution.

19. The method of claim 1 wherein the inert atmosphere comprises vacuum, helium, argon, nitrogen gas, or combinations thereof.

20. The method of claim 1 wherein the drying is carried out in a temperature range of from about 25° C. to about 300° C.

* * * * *